US012000236B2

(12) United States Patent
Orban et al.

(10) Patent No.: US 12,000,236 B2

(45) Date of Patent: Jun. 4, 2024

(54) CEMENT MIXER AND MULTIPLE PURPOSE PUMPER (CMMP) FOR LAND RIG

(71) Applicant: SCHLUMBERGER TECHNOLOGY CORPORATION, Sugar Land, TX (US)

(72) Inventors: Jacques Orban, Katy, TX (US); Shunfeng Zheng, Katy, TX (US); Bartley Patton, Sugar Land, TX (US); Eric Erickson, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 25 days.

(21) Appl. No.: 17/809,185

(22) Filed: Jun. 27, 2022

(65) Prior Publication Data

US 2022/0325601 A1 Oct. 13, 2022

Related U.S. Application Data

(63) Continuation of application No. 15/456,050, filed on Mar. 10, 2017, now Pat. No. 11,371,314.

(51) Int. Cl.

| | |
|---|---|
| ***E21B 33/13*** | (2006.01) |
| ***B28C 7/04*** | (2006.01) |
| ***B28C 9/00*** | (2006.01) |

(52) U.S. Cl.

CPC ............ *E21B 33/13* (2013.01); *B28C 7/0418* (2013.01); *B28C 9/004* (2013.01)

(58) Field of Classification Search

CPC .... B01F 35/7176; B01F 35/831; E21B 33/13; B28C 7/0418; B28C 9/004

See application file for complete search history.

(56) References Cited

U.S. PATENT DOCUMENTS

| | | | |
|---|---|---|---|
| 5,775,803 | A | 7/1998 | Montgomery et al. |
| 6,527,062 | B2 | 3/2003 | Elkins et al. |
| 6,749,330 | B2 | 6/2004 | Allen |
| 6,925,392 | B2 | 8/2005 | McNeil, III et al. |
| 7,044,239 | B2 | 5/2006 | Pinckard et al. |
| 7,730,967 | B2 | 6/2010 | Ballantyne et al. |
| 7,823,656 | B1 | 11/2010 | Williams |
| 7,921,937 | B2 | 4/2011 | Brackin et al. |
| 7,980,326 | B2 | 7/2011 | Tibbitts et al. |
| 8,201,628 | B2 | 6/2012 | Lovorn et al. |
| 8,261,826 | B2 | 9/2012 | Lovorn et al. |
| 8,281,875 | B2 | 10/2012 | Lovorn et al. |

(Continued)

FOREIGN PATENT DOCUMENTS

WO 2016167747 A1 10/2016

*Primary Examiner* — Elizabeth Insler

(74) *Attorney, Agent, or Firm* — Jeffrey D. Frantz

(57) ABSTRACT

Embodiments disclosed provide a pump assembly including a first pump for delivering at least one fluid. The first pump may include a first inlet coupled to the first pump for delivering at least one first fluid to the first pump, a second inlet coupled to the first pump for delivering at least one second fluid to the first pump, a first discharge coupled to the first pump for delivering the at least one first fluid at a first pressure, and a second discharge coupled to the first pump for delivering the at least one second fluid at a second pressure. In some embodiments, the first discharge and the second discharge are isolated from each other.

9 Claims, 3 Drawing Sheets

(56) References Cited

U.S. PATENT DOCUMENTS

| | | | | |
|---|---|---|---|---|
| 8,347,957 | B2 | 1/2013 | Stephenson et al. | |
| 8,397,836 | B2 | 3/2013 | Pool et al. | |
| 8,404,297 | B2 | 3/2013 | Arango Moreno | |
| 8,812,236 | B1 | 8/2014 | Freeman et al. | |
| 8,833,488 | B2 | 9/2014 | Knudsen et al. | |
| 8,899,348 | B2 | 12/2014 | Henderson et al. | |
| 8,905,157 | B2 | 12/2014 | Jiao et al. | |
| 9,080,407 | B2 | 7/2015 | Bernard | |
| 9,169,700 | B2 | 10/2015 | Curtis et al. | |
| 9,249,638 | B2 | 2/2016 | Bernard | |
| 2009/0183874 | A1 | 7/2009 | Fordyce et al. | |
| 2013/0248182 | A1 * | 9/2013 | Chong .................... | B28C 9/004<br>166/285 |
| 2014/0299377 | A1 | 10/2014 | Abbassian et al. | |
| 2014/0309936 | A1 | 10/2014 | Abbassian et al. | |
| 2016/0288368 | A1 | 10/2016 | Orban et al. | |
| 2017/0226813 | A1 | 8/2017 | Northam et al. | |

* cited by examiner

CEMENT MIXER AND MULTIPLE PURPOSE PUMPER (CMMP) FOR LAND RIG

CROSS-REFERENCE TO RELATED APPLICATION

This application is a continuation of U.S. patent application Ser. No. 15/456,050, filed Mar. 10, 2017, now U.S. Pat. No. 11,371,314.

BACKGROUND

Exploring, drilling, and completing hydrocarbon wells are generally complicated, time consuming and ultimately very expensive endeavors. This may be especially true in the case of certain drilling and completion operations where the configuration or environment of the operation or production site presents added challenges.

In certain drilling operations, the operating environment may pose several natural challenges dramatically affecting the expense of operations. In the case of land drilling, measures are often taken to curtail expenses such as keeping equipment and space for equipment to a minimum. That is, for a given land operation, any increase in the amount or types of equipment required, as well as the necessary accommodations, comes with a fairly dramatic increase in land set up and operating expenses. In certain circumstances expenses may be saved by limiting the equipment employed. However, even with certain sacrifices made in terms of equipment choices, redundancy and maximum equipment usage is desired in land operations.

Like most drilling rigs, a land rig generally includes both a mud pumping assembly and a cement pumping assembly along with a host of other drilling equipment. These assemblies in particular, are alternatingly employed in completing an underground well and providing a casing therefor. That is, as a drill bit is advanced downward to form and extend a borehole below ground, the mud pumping assembly is employed to both provide fluid and remove debris with respect to a location near the advancing bit. Once the borehole has been drilled to the desired depth by the drill bit, mud circulation is temporarily stopped with the drill bit and associated drilling pipe brought back to the surface. A section of borehole casing may then be advanced down into the borehole. Once the borehole casing is properly positioned and the mud circulation terminated, the cement pumping assembly may be operated to pump a cement slurry through the borehole, securing the borehole casing in place. This process may then be repeated until a well of the desired depth has been completed. That is, further drilling, mud circulation, and advancing of additional borehole casing, may continue, periodically interrupted by subsequent cementing and securing of the casing as described.

SUMMARY

Embodiments disclosed provide a pump assembly including a first pump for delivering at least one fluid. The first pump may include a first inlet coupled to the first pump for delivering at least one first fluid to the first pump, a second inlet coupled to the first pump for delivering at least one second fluid to the first pump, a first discharge coupled to the first pump for delivering the at least one first fluid at a first pressure, and a second discharge coupled to the first pump for delivering the at least one second fluid at a second pressure. In some embodiments, the first discharge and the second discharge are isolated from each other.

Embodiments disclosed also provide a well operation facility including a first pump for delivering at least one fluid to the borehole, a first inlet coupled to the first pump for delivering a first fluid to the pump, a second inlet coupled to the first pump for delivering a second fluid to the pump, a cement mixing system for delivering a cement slurry to the first inlet, a mud mixing system for delivering mud to the second inlet, a first discharge coupled to the first pump for delivering the cement slurry to a rig cementing line, and a second discharge coupled to the first pump for delivering the mud to a rig mud line.

Embodiments disclosed provide a method of delivering a fluid to a borehole. The method may include feeding a first fluid to a first pump, pumping the first fluid to the borehole through the first pump and a first discharge, feeding a second fluid to the first pump, circulating a second fluid through the first pump and the first discharge to clean the first pump, feeding a third fluid to the first pump, and pumping the third fluid to the borehole through the first pump and a second discharge.

Figure 1:
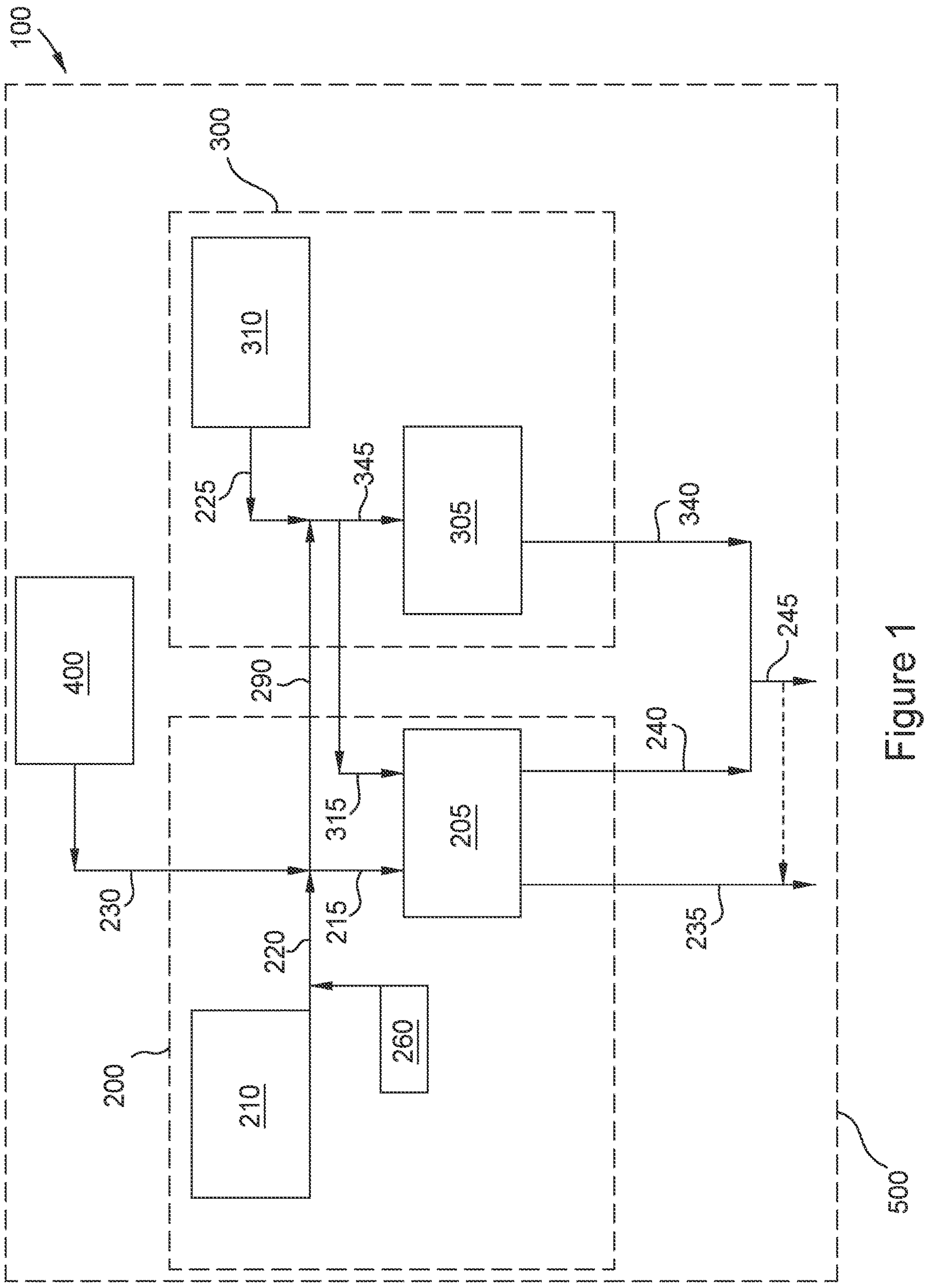
FIG. 1 illustrates a block diagram of a well operation facility, according to an embodiment.

It should be noted that some details of the figures have been simplified and are drawn to facilitate understanding of the embodiments rather than to maintain strict structural accuracy, detail and scale.

DETAILED DESCRIPTION

Reference will now be made in detail to embodiments of the present disclosure, examples of which are illustrated in the accompanying drawings. In the drawings and the following description, like reference numerals are used to designate like elements, where convenient. It will be appreciated that the following description is not intended to exhaustively show all examples, but is merely exemplary.

Embodiments of the present disclosure generally relate to providing a centralized metering and manifold platform system for supplying a multipurpose pump to supply either cement slurry or mud at a wellsite in an oilfield operation. In one or more embodiments, a particular multipurpose pump may alternate between or sequentially pump mud and cement slurry. Also provided are embodiments of a method for operating the centralized metering and manifold platform system for supplying a multipurpose pump to supply either cement slurry or mud at a wellsite in an oilfield operation.

As described, two different types of fluid, mud and cement slurry, may be present within (and pumped into) the borehole depending on what stage of the operation is in effect. However, these fluids serve entirely different purposes. The mud is circulated through the borehole with the purpose of lubricating, cooling, and furthering the advancement of the drill bit. On the other hand, cement is introduced to the borehole with the purpose of stabilizing the borehole casing in a secure and final position. Thus, the introduction of either of these fluids at the wrong time may be of dire consequence to the proper completion of the well. For example, the presence of no more than about 1%-3% mud at a location for cementing may prevent the cement slurry from setting and forming a proper bond between the borehole casing and the wall of the borehole at that location. On the other hand, cement contaminants within the mud during drilling may impede drilling and stop the advancement of borehole casing altogether. Either of these circumstances are likely to have severe consequences, perhaps requiring a shutdown of the entire operation for re-drilling at a new location, likely at a cost of several hundred thousand dollars if not more.

Given the potential catastrophic consequences of cement slurry or mud contamination at the improper stage of well completion, conventional mud pumping assemblies and the cement pumping assemblies are separately maintained and isolated from one another on the rig. Thus, the mud pumping assembly, operating 90%-97% of the time during active drilling operations, is operated from one location on the rig with multiple high horsepower prime movers, pumps and other equipment. When the time for cementing approaches, mud circulation is terminated and from a separate cementing room of the rig, the above described cement pumping assembly is operated, employing its own comparatively lower horsepower prime movers, pumps, and associated equipment. While understandable in light of the potential consequences of contamination as described above, this maintenance of entirely separate assemblies and associated equipment comes at a significant cost to already scarce footspace.

Referring now to FIG. 1, a well operation facility 100 including a cement pumping assembly 200, a mud pumping assembly 300, and a water assembly 400 is shown. The cement pumping assembly 200 may be integrated or coupled to the mud pumping assembly 300 and water assembly 400, such that equipment within each assembly may be used with a cement slurry, a mud, or water. The mud pumping assembly 300 may be integrated or coupled to the cement pumping assembly 200 and water assembly 400, such that equipment within each assembly may be used with a cement slurry, a mud, or water. In some embodiments, equipment located in the well operation facility 100 may have power supplied by the rig of a land drilling operation. The cement pumping assembly 200 may be easily connected into the well operation facility (rig) 100, including piping, power and computer network.

In some embodiments, the cement pumping assembly 200 may be located on a cement mixer and multiple purpose pumper (CMMP) platform 250. In other embodiments, the cement pumping assembly 200 and the mud pumping assembly 300 may be located on the CMMP platform 250. In still other embodiments, the cement pumping assembly 200, the mud pumping assembly 300, and the water assembly 400 may be located on the CMMP platform 250, either all together or in any combination. The CMMP platform 250 may be a mobile unit or a skid, both of which may be moved to various locations in a land drilling operation. By locating various combinations of the cement pumping assembly 200, the mud pumping assembly 300, and the water assembly 400 on mobile platforms, space and weight savings may reduce operational costs and provide other advantages to the well operation facility.

Continuing now with reference to FIG. 1, the cement pumping assembly 200 may include a multi-purpose pump 205 and a cement mixing assembly 210. In some embodiments, the multi-purpose pump 205 may be a triplex pump. In other embodiments, the multi-purpose pump 205 may be a quintaplex pump or any pump capable of providing the fluids at the desired properties. The cement mixing assembly 210 may include equipment necessary to supply a cement slurry downhole, such as, but not limited to, a compressor, one or more cement silos, a surge can, a mixer, a mixing tub, an overflow tub and one or more pumps. One of ordinary skill in the art would be able to design and size various equipment to be located in the cement pumping assembly 200 for complete cementing operations during land drilling operations.

In some embodiments, the multi-purpose pump 205 may be coupled to a first inlet 215 for delivering a plurality of fluids (such as cement and water) to the multi-purpose pump 205. The first inlet 215 is further coupled to a cement inlet 220 from which it receives cement from the cement mixing assembly 210 to be delivered to the multi-purpose pump 205 and a water inlet 230 from which it receives water from the water assembly 400 to be delivered to the multi-purpose pump 205. In some embodiments, the multi-purpose pump 205 may be further coupled to a second inlet 315. The second inlet 315 may be further coupled to a mud inlet 225 from which it receives mud from the mud pumping assembly 300 to be delivered to the multi-purpose pump 205. Through valving arrangements (not shown but appreciated by one of ordinary skill in the art), the first inlet 215, the second inlet 315, the cement inlet 220, the mud inlet 225 and the water inlet 230 may all be isolated from each other and the multi-purpose pump 205. In some embodiments, the first inlet 215 and the second inlet 315 may be a six-inch suction line, or particularly sized for the land drilling operation. In other embodiments, the cement inlet 220, the water inlet 230, and the mud inlet 225 may be a six-inch suction line, or particularly sized for the land drilling operation.

In some embodiments, the multi-purpose pump 205 may be coupled to a first outlet 235 for delivering a plurality of fluids (such as cement and water) from the multi-purpose pump 205 to a first destination. In some embodiments, a second outlet 240 may be coupled to a mud outlet 245 for delivering a fluid from the multi-purpose pump 205 to a second destination. Through valving arrangements (not shown but appreciated by one of ordinary skill in the art), the first outlet 235, the second outlet 240, and the mud outlet 245 may be isolated from each other and the cement pump 205. In some embodiments, the first outlet 235 may be a two-inch discharge line, or particularly sized for the land drilling operation. In some embodiments, the second outlet 240 may be a three-inch discharge line, or particularly sized for the land drilling operation. In some embodiments, the mud outlet 245 may be a three-inch discharge line, or particularly sized for the land drilling operation.

The mud pumping assembly 300 may include a mud pump 305 and a mud mixing assembly 310. In some embodiments, the mud pump 305 may be a triplex pump. In other embodiments, the mud pump 305 may be a quintaplex pump or any pump capable of providing the fluids at the desired properties. The mud mixing assembly 310 may include equipment necessary to supply a mud downhole, such as, but not limited to, mud storage, at least one mud tank, one or more pumps, one or more shale shakers, feed hoppers, mixers, etc. One of ordinary skill in the art would be able to design and size the various equipment to be located in the mud pumping assembly 300 for complete mud operations during land drilling operations. In some embodiments, the mud mixing assembly includes one or more mud pits.

In some embodiments, the mud pump 305 takes mud from the mud mixing assembly 310 and pumps it under high pressure into a bore hole. Mud, exiting under pressure from a bit, clears the cuttings and moves them out of the bore hole. The mud and cuttings may passed over a shale shaker which separates the cuttings from the mud and allows the mud to return to a mud tank for recirculation. The cuttings are sampled periodically for geologic purposes, but most are discarded.

In some embodiments, the mud pump 305 is coupled to a third inlet 345 for delivering a plurality of fluids to the mud pump 305. The third inlet 345 may be further coupled to the cement inlet 220, the mud inlet 225 and the water inlet 230. In some embodiments, the third inlet 345 is coupled to the cement inlet 220 and the water inlet 230 via cross over 290. Through valving arrangements (not shown but appreciated by one of ordinary skill in the art), the second inlet 315, the cement inlet 220, the mud inlet 225, the water inlet 230, the cross over 290, and the cement pump 205 may all be isolated from each other and the mud pump 305. In some embodiments, the third inlet 345 may be a six-inch suction line, or particularly sized for the land drilling operation.

In some embodiments, the mud pump 305 is coupled to a third outlet 340 for delivering a plurality of fluids from the mud pump 305. The third outlet 340 is further coupled to the mud outlet 245. The mud outlet 245 may also be optionally coupled to the first outlet 235. Through valving arrangements (not shown but appreciated by one of ordinary skill in the art), the third outlet 340, the second outlet 240, the first outlet 235, the mud outlet 245, and the multi-purpose pump 205 may all be isolated from each other and the mud pump 305. In some embodiments, the third outlet 340 may be a three-inch discharge line, or particularly sized for the land drilling operation.

In some embodiments, the multi-purpose pump 205 may be electrically driven by a power supply for the well operation facility 100, such as, but not limited to, a rig generator. The multi-purpose pump 205 may be sized to be equivalent to the mud pump 305. The multi-purpose pump 205 may be sized to operate at rates and pressures sufficient for cementing operations and at rates and pressures sufficient to act as a back-up mud pump or a supplement mud pump in surface string operations. In some embodiments, the multi-purpose pump 205 may be used as a primary cement pump, a primary mud pump for surface casing or a backup mud pump for intermediate and long string drilling. In other embodiments, the multi-purpose pump 205 may be sized for a wide range of pumping, such as, but not limited to high flow rate, long duration, high pressure and low flow. In some embodiments, the multi-purpose pump 205 may include a variable frequency drive located within the cement pumping assembly. In other embodiments, redundancy of the drives may be provided such that the cement pump may continuously operate.

In some embodiments, the mud pump 305 may be electrically driven by a power supply for the well operation facility 100, such as, but not limited to, the rig generator. The mud pump 305 may be sized to be equivalent to the multi-purpose pump 205. The mud pump 305 may be sized to operate at rates and pressures sufficient for mud operations and at rates and pressures sufficient to act as a primary mud pump. In some embodiments, the mud pump 305 may be used as a primary mud pump or a backup cement pump. In other embodiments, the mud pump 305 may be sized for a wide range of pumping, such as, but not limited to high flow rate, long duration, high pressure and low flow.

In some embodiments, the well operation facility 100 may include a liquid additive system assembly 260 for delivering liquid additives to the cement pumping assembly 200 and/or the mud pumping assembly 300. The liquid additive system 260 includes equipment, known to one of ordinary skill in the art, for adding various liquid additives into a cement slurry, a mud slurry, or both. In some embodiments, the liquid additive system 260 may include one or more containers for storing one or more additives, a meter for moving a substance at a controlled rate, and a mixer for mixing a plurality of substances into a mixture. Furthermore, the additives may not be limited to gellants, but may include any additive used in the formulation of wellbore fluids, including cement and mud. While shown in the cement pumping assembly 200, the liquid additive system 260 may be located in the mud pumping assembly 300 or anywhere in the well operation facility 100.

In some embodiments, the water assembly 400 is provided to circulate water throughout the well operation facility 100. The water may be circulated from the water assembly 400 through the equipment located in the cement pumping assembly 200, the mud pumping assembly 300 or both to clean the equipment located therein. In some embodiments, the first inlet 215 may be coupled to the water assembly 400 via the water inlet 230, which may be used to clean the equipment of the cement pumping assembly 200, including the multi-purpose pump 205. In some embodiments, the third inlet 345 may be coupled to the water assembly 400 via the water inlet 230, which may be used to clean the equipment of the mud pumping assembly 300, including the mud pump 305.

In some embodiments, the well operation facility 100 may include a control unit 500 for directing the well operation, including, but not limited to, mud pumping and cementing operations. Thus, a single operator may direct well operations from a single location at the well operation facility 100, thus efficiently streamlining operator interfacing with the cement pumping assembly 200, the mud pumping assembly 300, and the water assembly 400. In other embodiments, individual control units may be provided for the cement pumping assembly 200, the mud pumping assembly 300, and the water assembly 400. In some embodiments, the control unit 500 may be located at the drilling site or may be located remotely, with both having emergency stop capability.

In some embodiments, the cement pumping assembly 200 may include multiple subsystems which may provide for automatic control of water pressure, water rate, slurry density, recirculating slurry pressure, and downhole pump rate. Cement pumping assembly 200 may be controlled locally or remotely for cement operations from a local remote HMI. During mud pumping operations, the cement pumping assembly 200 may be turned over to the mud pumping assembly 300 and become active on the mud pumping assembly 300's HMI screen for control. Each subsystem operates independently but in response to control from the control unit 500. The cement pumping assembly may include automatic combined and interrelated density and pumping control and selectable sequential control of predetermined mixing and pumping stages. At least as to the water rate control subsystem, the slurry density control subsystem and the downhole pump rate control subsystem, the control unit 500 generates control signals interrelated by set points entered by an operator through an operator interface panel connected to the control unit 500. The control unit 500 also provides set point control signals to the water pressure and the recirculating slurry pressure control subsystems. The subsystems may function separately to simplify the control to single-input, single-output control loops that provide a more fault tolerant system. In some embodiments, specific conditions which may be automatically controlled include water rate, water pressure, slurry density, recirculating slurry pressure and downhole pump rate. Each of these conditions may be the subject of a respective control loop that operates independently, but under control from control unit 500. The control unit 500 generates interrelated inlet water, inlet dry cement and outlet downhole pumping control signals responsive to operated-entered desired operating characteristics.

In some embodiments, the mud pumping assembly 300 may include multiple subsystems which may provide for automatic control of water pressure, water rate, mud density, recirculating mud pressure, and downhole pump rate. Mud pumping assembly 300 may be controlled locally or remotely for mud operations from a local remote HMI. During cement pumping operations, the mud pumping assembly 300 may be turned over to the cement pumping assembly 200 and become active on the cement pumping assembly 200's HMI screen for control. Each subsystem operates independently but in response to control from the control unit 500. At least as to the water rate control subsystem, the mud density control subsystem and the downhole pump rate control subsystem, the control unit 500 generates control signals interrelated by set points entered by an operator through an operator interface panel connected to the control unit 500. The control unit 500 also provides set point control signals to the water pressure and the recirculating mud pressure control subsystems. The subsystems may function separately to simplify the control to single-input, single-output control loops that provide a more fault tolerant system.

In some embodiments, the control unit 500 may be used to automate and manage the flow of fluid between the cement pumping assembly 200, the mud pumping assembly 300, and the water assembly 400. Each of the cement pumping assembly 200, the mud pumping assembly 300, and the water assembly 400 may include various flowmeters, sensors, etc. such that the control unit 500 may be programmed to manage the flow between the borehole and the cement pumping assembly 200, the mud pumping assembly 300, and the water assembly 400 and changes between the operation of each. The control unit 500 may also be programmed to identify equipment within the cement pumping assembly 200, the mud pumping assembly 300, and the water assembly 400. The control unit 500 may also be programmed to isolate equipment within the cement pumping assembly 200, the mud pumping assembly 300, and the water assembly 400, such that contamination may be limited. The control unit 500 may also be programmed to provide an automatic equipment cleaning cycle within the cement pumping assembly 200, the mud pumping assembly 300, and the water assembly 400, and combinations thereof such that contamination may be limited.

In some embodiments, the cement inlet 220 may supply cement slurry from the cement mixing assembly 210 to the multi-purpose pump 205 via the first inlet 215. The water inlet 230 may supply water from the water assembly 400 to the multi-purpose pump 205 via the first inlet 215. The mud inlet 225 may supply mud from the mud mixing assembly 310 to the multi-purpose pump 205 via the second inlet 315. In operation, multi-purpose pump 205 may be used to pump (at different times) both mud and cement. Specifically, the top section of a well generally requires a greater number of pumps to pump mud therein during than later sections of the well. Thus, instead of having a mud pump being offline (not used) throughout the remainder of the drilling and completion operations, the present disclosure provides for multi-purpose pump(s) that is configured to receive mud and cement and can be used to pump either, depending on the stage of the operation. Multi-purpose pump 205 is such a multi-purpose pump.

In some embodiments, the cement inlet 220 may supply cement slurry from the cement mixing assembly 210 to the mud pump 305 via the third inlet manifold 345 via crossover 290. The water inlet 230 may supply water from the water assembly 400 to the mud pump 305 via the third inlet manifold 345 via crossover 290. The mud inlet 225 may supply mud from the mud mixing assembly 310 to the mud pump 305 via the third inlet manifold 345. In operation, mud pump 305 may primarily serve to deliver mud downhole, while multi-purpose pump 205 may pump (at different times) both mud and cement into a given well; however, if mud pump 305 is pre-configured to also receive cement, then in the event of a breakdown of multi-purpose pump 205, mud pump 305 may be used to pump cement as well. While mud pump 305 may not generally be used as a multi-purpose pump, embodiments of the present disclosure may include mud pump 305 being configured to operate as such, if such need arises during well operations. The pipings achieving such configuration are described herein.

In some embodiments, the first outlet 235 may supply cement slurry from the multi-purpose pump 205 to the borehole at a first pressure. The first outlet 235 may supply water from the multi-purpose pump 205 for disposal. The mud outlet 245 may supply mud from the multi-purpose pump 205 to the borehole at a second pressure via the second outlet 240. It is understood that the first pressure and the second pressure may be different (specifically, in one or more embodiments, the first pressure (for cement) is lower than the second pressure (for mud)).

In some embodiments, such as if the multi-purpose pump 205 goes down, the third outlet 340 may supply cement slurry from the mud pump 305 to the borehole at the first pressure via the first outlet 235. The third outlet 340 may supply mud from the mud pump 205 to the borehole at the second pressure via the mud outlet manifold 245. It is understood that the first pressure and the second pressure may be different (specifically, in one or more embodiments, the first pressure (for cement) is lower than the second pressure (for mud)).

Flexibility in the well operation facility 100 may be found by having the multi-purpose pump 205 being capable of being fed cement from the cement mixing assembly 200 or mud from the mud pumping assembly 300 and being able to deliver either the cement or mud to the wellbore at two different pressures, depending on the fluid being pumped. The flexibility may also be achieved by having the mud pump 305 being capable of being fed cement from the cement mixing assembly 200 or mud from the mud pumping assembly 300 and being able to deliver either the cement or mud to the wellbore at two different pressures, depending on the fluid being pumped. Thus, the cement pump 205 and the mud pump 305 may be used as redundancy/backup for each other. By having the water assembly 400 provide water to both the cement pump 205 and the mud pump 305, the pumps may be cleaned to limit the risk of contamination between the pumps and associated equipment and piping. In some embodiments, the water assembly 400 may also provide water to both the cement pumping assembly 200 and the mud pumping assembly 300 to provide water to all equipment located therein. Isolation between the water assembly 400, the cement pumping assembly 200 and the mud pumping assembly 300 may be provided by numerous valves which may limit the risk of contamination between the assemblies.

The well operation assembly 100, specifically the ends of the electrical lines, hydraulic lines and/or pneumatic lines, and the equipment located therein may have plug-and-play connections, such as, for example but not limited to, those sold by Parker Hannifin Corp. (Minneapolis, MN) or Stucchi USA Inc., Romeoville, IL. The plug-and-play connections may connect the electrical lines, the hydraulic lines and/or the pneumatic lines from the well operation assembly 100 to the cement pumping assembly 200, the mud pumping assembly 300 and the water assembly 400. A centralized engine located within the well operation assembly 100 may supply power to the equipment located within the cement pumping assembly 200, the mud pumping assembly 300 and the water assembly 400. The plug-and-play connections may be integrated into the cement pumping assembly 200, the mud pumping assembly 300 and the water assembly 400 and the equipment located therein may be provided with universal terminals so that when plugged into each other, the terminals will make a proper connection, such as a power, a hydraulic or a pneumatic connection, between a central source, including a central electricity line, a central hydraulic line and/or a central pneumatic line, and the equipment.

Figure 2:
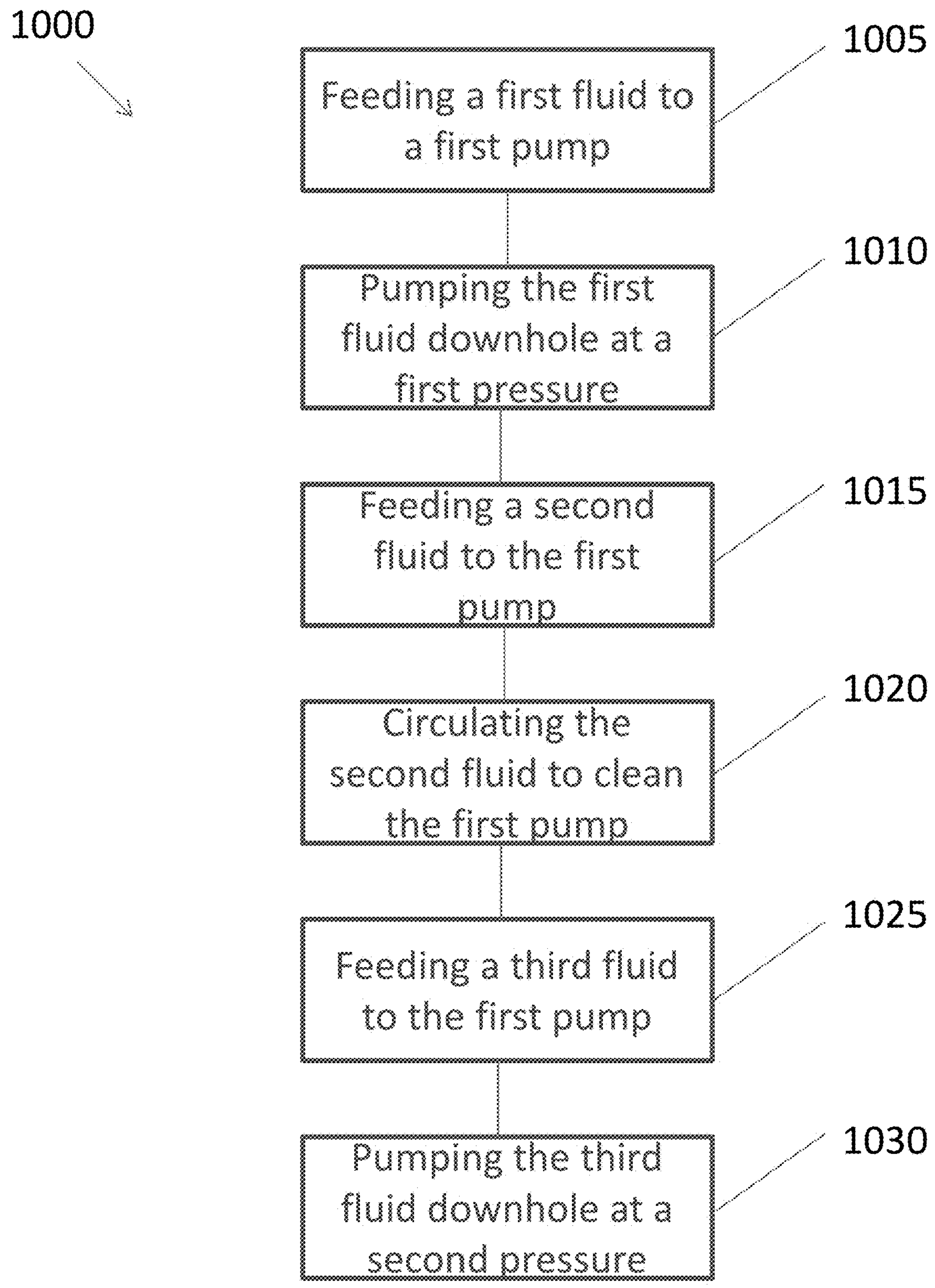
FIG. 2 illustrates a flow diagram for a well operation process of delivering one or more fluids to a borehole via a first pump, according to an embodiment.

An embodiment of a well completion process using the well operation facility 100 is shown in FIG. 2. During drilling, mud may be pumped downhole via the mud pumping assembly 300. In some embodiments, the mud pump 305 is sized and may include redundancy, to maintain consistent flow of mud downhole. The mud pumping assembly 300 has various pieces of equipment, including sensors and controllers, for monitoring the flow and composition of the mud being pumped downhole and also being returned to the mud pumping assembly 300 for recycling. In some embodiments, redundancy may be provided by having a plurality of mud pumps 305 so that if for some reason one of the mud pumps is unable to complete the drilling operation, the other mud pump or the cement pump 205 may be put into operation to complete the drilling. Thus, the multi-purpose pump 205 may have duality for pumping mud and/or cement, by being sized and piped to accommodate both wellbore fluids. In other embodiments, the mud pump 305 may provide redundancy as a backup cement pump thereby providing duality for pumping mud and/or cement, by being sized and piped to accommodate both wellbore fluids.

In some embodiments, the multi-purpose pump 205 may be called into service either as an additional mud pump or as a backup mud pump to mud pump 305. In some embodiments, the mud may be fed as a first fluid to the multi-purpose pump 205 in stage 1005 of flow diagram 1000 as shown in FIG. 2. To feed the mud to the multi-purpose pump 205, the multi-purpose pump 205 may be isolated from the cement mixing assembly 210 and the water assembly 400. Valving may be manipulated to ensure mud flows from the mud pumping assembly 300 via the mud inlet 225 to the first inlet 215. The multi-purpose pump 205 pressurizes the mud to a first pressure in stage 1010. Valving may also be manipulated to ensure mud flows from the multi-purpose pump 205 from the second outlet 240 to the borehole via mud outlet 245 at the first pressure. The first pressure typically ranges from about 3000 kPa to about 50000 kPa, or from about 3400 kPa to about 49000 kPa.

When it is determined to stop the mud flow via the mud inlet 225 to the multi-purpose pump 205, the multi-purpose pump 205 may be isolated from the mud mixing assembly 310 and the cement mixing assembly 210. Valving may be manipulated to ensure water, as a second fluid, may flow from the water assembly 400 via water inlet 230 to the first inlet 215 in stage 1015. Water may then be circulated throughout the piping and multi-purpose pump 205 to clean the multi-purpose pump 205 and associated equipment in stage 1020. The circulation may be manipulated through valving to ensure water may flow from the multi-purpose pump 205 from the second outlet 240 to disposal facilities.

In some embodiments to complete the well, cement may be pumped via the multi-purpose pump 205. The cement may be fed as a third fluid to the multi-purpose pump 205 in stage 1025. To feed the cement to the multi-purpose pump 205, the multi-purpose pump 205 may be isolated from the mud mixing assembly 310 and the water assembly 400. Valving may be manipulated to ensure cement flows from the cement pumping assembly 200 via the cement inlet 220 to the first inlet 215. The multi-purpose pump 205 pressurizes the cement to a second pressure in step 1030. Valving may also be manipulated to ensure cement flows from the multi-purpose pump 205 from the first outlet 235 to the borehole at the second pressure. The second pressure typically ranges from about 3000 kPa to about 70000 kPa, or 3400 kPa to 69000 kPa.

Optionally, when it is determined to stop the cement flow via the cement inlet 220 to the multi-purpose pump 205, the multi-purpose pump 205 may be isolated from the cement mixing assembly 210 and the mud mixing assembly 310. Valving may be manipulated to ensure water may flow from the water assembly 400 via water inlet 230 to the first inlet 215, in a repeat of stage 1015. Water may then be circulated throughout the piping and multi-purpose pump 205 to clean the multi-purpose pump 205 and associated equipment, in a repeat of stage 1020. The circulation may be manipulated through valving to ensure water may flow from the multi-purpose pump 205 from the first outlet 235 to disposal facilities.

Figure 3:
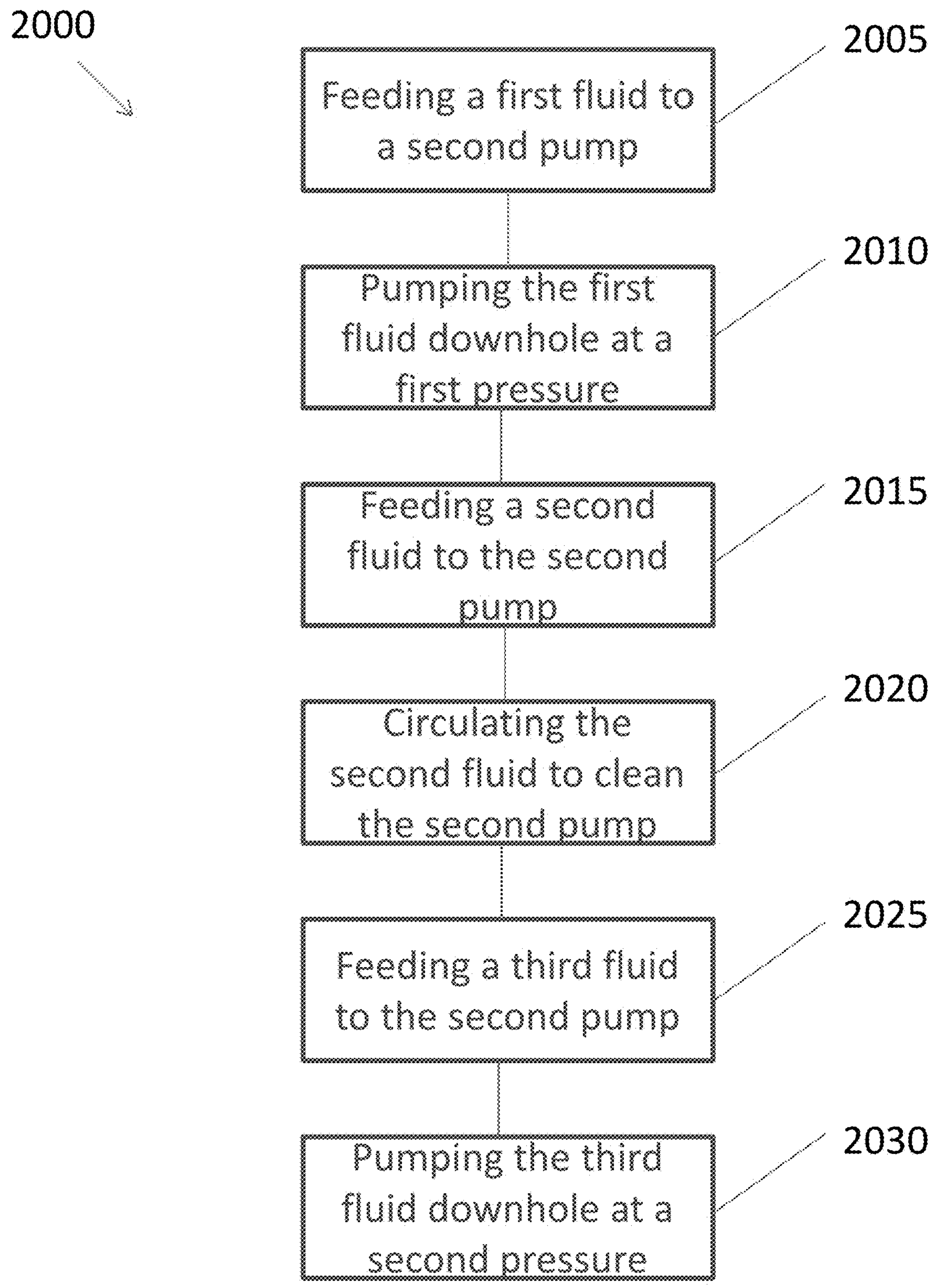
FIG. 3 illustrates a flow diagram for a well operation process of delivering one or more fluids to a borehole via a second pump, according to an embodiment.

In some embodiments, the well operation process may optionally include redundancy of the mud pump 305, such that the mud pump 305 is sized to maintain consistent flow of mud and/or cement downhole as shown in FIG. 3. In some embodiments, the mud pump 305 may be called into service either as an additional mud pump or as a backup pump to multi-purpose pump 205. In some embodiments, the mud may be fed as a first fluid to the mud pump 305 in stage 2005 of flow diagram 2000 as shown in FIG. 3. To feed the mud to the mud pump 305, the mud pump 305 may be isolated from the cement mixing assembly 210 and the water assembly 400. Valving may be manipulated to ensure mud flows from the mud pumping assembly 300 via the mud inlet 225 to the third inlet 345. The mud pump 305 pressurizes the mud to a first pressure in stage 2010. Valving may also be manipulated to ensure mud flows from the mud pump 305 from the third outlet 340 to the borehole via mud outlet 245 at the first pressure. The first pressure typically ranges from about 3000 kPa to about 50000 kPa, or from about 3400 kPa to about 49000 kPa.

When it is determined to stop the mud flow via the mud inlet 225 to the mud pump 305, the mud pump 305 may be isolated from the mud mixing assembly 310 and the cement mixing assembly 210. Valving may be manipulated to ensure water may flow from the water assembly 400 via water inlet manifold 230 to the third inlet 345 in stage 2015. Water may then be circulated throughout the piping and the mud pump 305 to clean the mud pump 305 and associated equipment in step 2020. The circulation may be manipulated through valving to ensure water may flow from the mud pump 305 from the second outlet manifold mud 335 to disposal facilities.

In some embodiments to complete the well, cement may be pumped via the mud pump 305. The cement may be fed as a third fluid to the mud pump 305 in step 2025. To feed the cement to the mud pump 305, the mud pump 305 may be isolated from the mud mixing assembly 310 and the water assembly 400. Valving may be manipulated to ensure cement flows from the cement pumping assembly 200 via the cement inlet 220 to the third inlet 345. The mud pump 305 pressurizes the cement to a second pressure in step 2030. Valving may also be manipulated to ensure cement flows from the mud pump 305 from the third outlet 345 to the borehole via first outlet 235 at the second pressure. The second pressure typically ranges from about 3000 kPa to about 70000 kPa, or 3400 kPa to 69000 kPa.

Optionally, when it is determined to stop the cement flow via the cement inlet manifold 220 to the mud pump 305, the mud pump 305 may be isolated from the cement mixing assembly 210 and the mud mixing assembly 310. Valving may be manipulated to ensure water may flow from the water assembly 400 via water inlet manifold 230 to the third inlet 345, in a repeat of step 2015. Water may then be circulated throughout the piping and mud pump 305 to clean the mud pump 305 and associated equipment, in a repeat of step 2020. The circulation may be manipulated through valving to ensure water may flow from the mud pump 305 from the third outlet manifold 340 to disposal facilities.

While the present teachings have been illustrated with respect to one or more embodiments, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A pump assembly comprising:

a first line for delivering a first fluid;

a second line for delivering a second fluid, wherein the first line is coupled to the second line;

a first pump;

a second pump;

a first suction line coupled to the first line and the first pump for delivering the first fluid to the first pump;

a second suction line coupled to the second line and the second pump for delivering the first fluid and the second fluid to the second pump;

a third line coupled to the first line and the second suction line coupled to the second pump, the third line for delivering the first fluid to the second suction line coupled to the second pump from the first line;

a third suction line coupled to the first pump for delivering the first fluid and the second fluid to the first pump;

a fourth line coupled to the second line, the third line, and the third suction line coupled to the first pump, the fourth line for delivering the first fluid from the third line to the third suction line and for delivering the second fluid from the second line to the third suction line;

a first discharge line coupled to the first pump for delivering the first fluid from the first pump at a first pressure; and a second discharge line coupled to the first pump for delivering the second fluid from the first pump at a second pressure, wherein the first discharge line and the second discharge line are isolated from each other; and a third discharge line coupled to the second pump for delivering the first fluid and the first pressure and the second fluid at the second pressure from the second pump.

2. The pump assembly of claim 1, wherein the first suction line, the second suction line, and the third suction line are substantially isolated from each other.

3. The pump assembly of claim 1, wherein the second discharge line is substantially isolated from the third discharge line.

4. The pump assembly of claim 1, further comprising a unitary control unit to direct the delivering of the first fluid and the second fluid to the first pump and the second pump.

5. The pump assembly of claim 1, wherein the first fluid is a cement slurry and the second fluid is a mud.

6. The pump assembly of claim 1, further comprising:

a fifth line coupled to the first suction line, the fifth line for delivering water to the first suction line, and wherein the first suction line is for delivering the water to the first pump.

7. The pump assembly of claim 6, further comprising:

a sixth line coupled to the first line for delivering a liquid additive to the first fluid in the first line.

8. The pump assembly of claim 1, further comprising:

a fifth line coupled to the second discharge line and the third discharge line and extending to a wellbore, wherein the fifth line is for delivering the second fluid discharged from the first pump and the second pump into the wellbore at the second pressure; and the first discharge line extends to the wellbore, wherein the first discharge line is for delivering the first fluid from the first pump into the wellbore at the first pressure.

9. The pump assembly of claim 8, further comprising:

a sixth line extending from the fifth line to the first discharge line, the sixth line for delivering the second fluid at the second pressure from the fifth line into the first discharge line.

* * * * *